(12) United States Patent
Hampel et al.

(10) Patent No.: US 9,266,779 B2
(45) Date of Patent: Feb. 23, 2016

(54) ARGILLACEOUS GYPSUM

(75) Inventors: Christina Hampel, Rutihof (CH); Jabbar Ai Shemari, Zurich (CH); Jorg Zimmermann, Winterthur (CH); Robert Flatt, Feldmeilen (CH)

(73) Assignee: SIKA TECHNOLOGIES AG, Baar (CH)

( * ) Notice: Subject to any disclaimer, the term of this patent is extended or adjusted under 35 U.S.C. 154(b) by 193 days.

(21) Appl. No.: 13/519,097

(22) PCT Filed: Dec. 14, 2010

(86) PCT No.: PCT/EP2010/069583
§ 371 (c)(1),
(2), (4) Date: Jun. 25, 2012

(87) PCT Pub. No.: WO2011/076612
PCT Pub. Date: Jun. 30, 2011

(65) Prior Publication Data
US 2012/0264851 A1    Oct. 18, 2012

(30) Foreign Application Priority Data
Dec. 24, 2009 (EP) .................... 09180738

(51) Int. Cl.
| C08K 5/17 | (2006.01) |
| C08K 5/19 | (2006.01) |
| C04B 28/14 | (2006.01) |
| C04B 40/00 | (2006.01) |
| C04B 111/00 | (2006.01) |
| C04B 111/60 | (2006.01) |

(52) U.S. Cl.
CPC ............. C04B 28/14 (2013.01); C04B 40/0039 (2013.01); *C04B 2111/0062* (2013.01); *C04B 2111/00672* (2013.01); *C04B 2111/60* (2013.01)

(58) Field of Classification Search
CPC ...... C04B 28/14; C04B 24/122; C04B 24/32; C04B 40/00; C08K 5/17; C08K 5/19

USPC ................ 524/5, 186, 81, 236, 243, 244
See application file for complete search history.

(56) References Cited

U.S. PATENT DOCUMENTS

| 6,139,623 A * | 10/2000 | Darwin et al. ................ 106/823 |
| 2005/0188896 A1 | 9/2005 | Bury et al. |
| 2008/0227890 A1 | 9/2008 | Maeder et al. |
| 2009/0227709 A1 | 9/2009 | Maeder et al. |

FOREIGN PATENT DOCUMENTS

| WO | WO 98/58887 A1 | 12/1998 |
| WO | WO 02/083594 A1 | 10/2002 |
| WO | WO 2005/123621 A1 | 12/2005 |
| WO | WO2009/035433 | *  3/2009 |
| WO | WO 2009/035433 A1 | 3/2009 |
| WO | WO 2009/068899 A2 | 6/2009 |

OTHER PUBLICATIONS

Technical Bulletin, Jeffamine M-2070 Polyetheramine, 2 pages.*
Technical Bulletin, Jeffamine M-1000 Polyetheramine, 2 pages.*
Technical Bulletin, Jeffamine M-2070 Polyetheramine, 2007, 2 pages.*
Technical Bulletin, Jeffamine M-1000 Polyetheramine, 2007, 2 pages.*
International Preliminary Report on Patentability issued in International Patent Application No. PCT/EP2010/069583 dated Jul. 10, 2012.
International Search Report dated Apr. 27, 2011 for International Application No. PCT/EP2010/069583 (with translation).
Mar. 3, 2015 Decision on Final Rejection issued in Japanese Application No. 2012-545221.

* cited by examiner

*Primary Examiner* — James J Seidleck
*Assistant Examiner* — Deve E Valdez
(74) *Attorney, Agent, or Firm* — Oliff PLC

(57) ABSTRACT

Additives selected from primary, secondary, and tertiary alkyl amines and quaternary alkyl ammonium compounds are added to argillaceous gypsum compositions comprising comb polymers to improve the workability thereof. Argillaceous gypsum compositions, dispersing agents, a method for producing argillaceous gypsum compositions, and molded parts that can be produced from the gypsum compositions are also described.

13 Claims, 1 Drawing Sheet

ARGILLACEOUS GYPSUM

TECHNICAL FIELD

Figure 1:
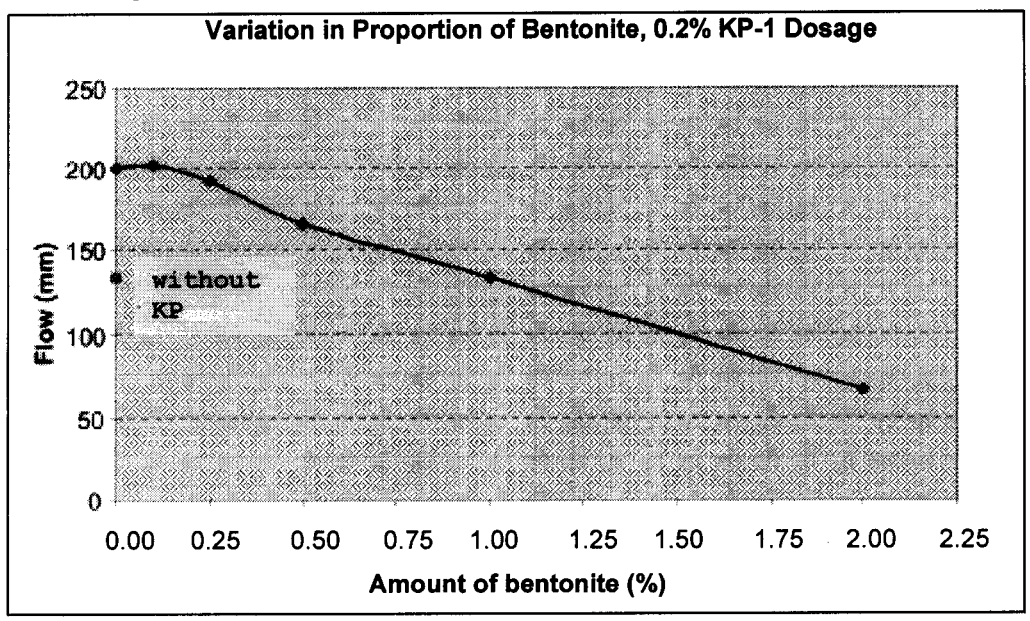

The invention concerns the use of additives, which are chosen from primary, secondary, and tertiary alkyl amines and quaternary alkyl ammonium compounds to improve the workability of argillaceous gypsum compositions that contain comb polymers. The invention also concerns argillaceous gypsum compositions, dispersants, methods for manufacturing argillaceous gypsum compositions, and shaped bodies which can be manufactured from the gypsum compositions.

PRIOR ART

Gypsum is an important building material that is used for many applications. For example, gypsum preparations are used for the manufacture of drywall, for spackling compounds, for wall plaster, or for the manufacture of floor plastering. Gypsum is a synonym for calcium sulfate. It can, depending on the manufacturing method, occur in different modifications, which differ in the content of water of crystallization and in the crystalline form.

Technically, the property of gypsum is utilized, by heating (calcining) to further absorb partially or completely removed water of crystallization upon addition of water and to set at the same time. Because more water is needed for the workability than is necessary for setting, the excess water (up to 65%) has to be removed again. Such a moist gypsum composition can be shaped.

In the processing of gypsum, the need exists to reduce the water content. The set gypsum is thereby less porous and more stable. With a lower water content, a shorter drying process is sufficient.

According to prior art, water reduction is achieved by adding "liquefiers" to the gypsum. Polymers are suitable, in particular comb polymers, in which pendant chains are bound by ester, amide, and/or ether groups to a backbone chain. With the addition of such comb polymers to gypsum compositions, a reduced amount of water is required to obtain the viscosity necessary for the processing.

In prior art, the problem exists of comb polymers not being effective as liquefiers or only somewhat effective when an argillaceous gypsum is used as a gypsum component. With the addition of comb polymers to clay-free gypsum, the viscosity decreases, and as a result, the workability of aqueous gypsum compositions increases. This behavior is hardly present in argillaceous gypsum or does not exist at all. Comb polymers therefore do not bring about the desired liquefying action with argillaceous gypsum compositions.

To solve this problem, it was proposed in patent WO 2009/068899, to add, besides a comb polymer, a basic water-soluble polymer which has a particular affinity for clay. This method exhibits the disadvantage that, in addition to the comb polymer, a further complex polymer has to be added to the gypsum composition. Special polymers are comparatively expensive to manufacture and consequently are costly.

DESCRIPTION OF THE INVENTION

The invention is based on the problem of making a simple and efficient method available for liquefying argillaceous gypsum compositions. The additives and compositions used for this should be simply and cost-effectively available and should lead to efficient liquefaction. In particular, additives should be prepared which make it possible to use comb polymers in small dosages only to achieve a liquefying action. Moreover, having the gypsum composition exhibit a high proportion of organic polymers should be avoided, because this can lead to changes in the structure and consequently the properties of the product.

Implementation of the Invention

An object of the invention is the use of an additive which is chosen from primary, secondary, or tertiary alkyl amines and quaternary alkyl ammonium compounds which, if applicable, each exhibit at least one hydroxy group and/or ether group, to improve the workability of argillaceous gypsum compositions that contain at least one comb polymer that exhibits pendant chains bound by ester, amide, and/or ether groups to a backbone chain.

The expression "to improve the workability of argillaceous gypsum compounds" is to be understood in the present connection in particular as the liquefaction of argillaceous gypsum compositions. The additive used according to the invention makes possible, in particular, an improvement in the liquefying action of at least one of the comb polymers present in the argillaceous gypsum compositions.

A not-yet-set argillaceous gypsum composition and/or a flowable argillaceous gypsum composition is the argillaceous gypsum composition.

Preferably alkyl amines, in particular monoamines, diamines, or triamines, can be used as additives according to the invention.

The additives exhibit in particular embodiments at least one hydroxy group and/or at least one ether group. For example, the compounds can exhibit, respectively, one or a plurality of hydroxy groups and/or one or a plurality of ether groups. In a preferred embodiment, the compounds exhibit a plurality of ether groups.

Surprisingly, by the addition according to the invention of additives to argillaceous gypsum compositions, it can be achieved that the comb polymers contained therein achieve good liquefying action. It is also not required to additionally use a basic water-soluble polymer, as is disclosed in WO 2009/068899. In a preferred embodiment, no further basic water-soluble polymer in accordance with WO 2009/068899 is used, in particular no polyvinyl pyrrolidone, polyvinyl alcohol derivative, or starch additive. The use of such polymers is, however, fundamentally possible.

With the use according to the invention, the argillaceous gypsum compositions show in particular an extended workability. This means that the argillaceous gypsum compositions with the at least one comb polymer remain, after addition of water and the additive in particular, still workable over a comparatively longer time, in particular compared with compositions that do not contain the additive, or in comparison with compositions that contain moieties corresponding to other additives such as conventional liquefiers.

In a preferred embodiment of the invention, the alkyl amines are mono-amines, diamines, or triamines. Preferably, the monoamines are those in which the amino group is terminally substituted at a carbon atom of the alkyl chain (α-amine). The diamines preferred are those in which both amino groups are substituted at both terminal C atoms of a linear alkyl chain (α-, Ω-diamine).

In a preferred embodiment, a primary amine is used which is at the same time a primary alcohol. Both of the substituents can then be in α-,Ω-positions. In a preferred embodiment with the primary, secondary, and tertiary alkylamines and quaternary alkyl ammonium compounds according to the invention, the alkyl group is a linear, not a branched alkyl group.

The alkylamines can be used according to the invention in any known form. It is known to the person skilled in the art that in basic amines, an equilibrium exists between the protonated and deprotonated forms. Insofar as amines are present in an acidic solution, they hence exhibit a moiety corresponding to the pH value in the ammonium compound. The amines can also be used as components of metal complexes. It is known that amines form metal complexes with a plurality of amino groups. For example, copperamine complexes can be used according to the invention, such as copper (II) ethylenediamine hydroxide.

In a preferred embodiment of the invention, the alkylamines are chosen from $$R1-NH_2, R2-NH-R2', \text{ and } NH_2-R3-NH_2,$$

wherein R1, R2, and R2' are alkyl groups independent of one another with 1 to 200 C atoms, and
R3 is an alkyl group with 1 to 150 C atoms.
In a preferred embodiment of the invention,
R1, R2, and R2' are alkyl groups independent of one another with 30 to 150 C atoms, and
R3 is an alkyl group with 20 to 120 C atoms.

In a preferred embodiment of the invention, the alkylamines are polyether amines, in particular polyether monoamines or polyether diamines.

Preferred polyether amines are ether-group-bearing aliphatic monoamines, in particular polyoxyalkylene monoamines. These are, for example, those available under the name of Jeffamine® (from Huntsman). In particular, suitable polyoxyalkyl-ene monoamines are Jeffamine® M-600, Jeffamine® M-1000, Jeffamine® M-2005, and Jeffamine® M-2070.

Further preferred polyetheramines are ether-group-bearing aliphatic diamines, for example bis-(2-aminoethyl)ether; 3,6-dioxaoctane-1,8-diamine; 4,7-dioxadecane-1,10-diamine; 4,7-dioxadecane-2,9-diamine; 4,9-dioxadodecane-1,12-diamine; 5,8-dioxadodecane-3,10-diamine, and higher oligomers of these diamines; bis-(3-aminopropyl) polytetrahydrofurans and other polytetrahydrofuran diamines with molecular weights in the range of 350 to 5200, for example, as well as polyoxy-alkylene diamines. The latter represent typical products from the amination of polyoxyalkylene diols and are, for example, available under the name of Jeffamine® (from Huntsman), under the name of polyetheramine (from BASF), or under the name of PC Amine® (from Nitroil). Particularly suitable polyoxyalkylene diamines are Jeffamine® D-230, Jeffamine® D-400, Jeffamine® D-2000, Jeffamine® D-4000, Jeffamine® XTJ-511, Jeffamine® ED-600, Jeffamine® ED-900, Jeffamine® ED-2003, Jeffamine® XTJ-568, Jeffamine® XTJ-569, Jeffamine® XTJ-523, Jeffamine® XTJ-536, Jeffamine® XTJ-542, Jeffamine® XTJ-559, Jeffamine® EDR-104, Jeffamine® EDR-148, Jeffamine® EDR-176; polyetheramine D 230, polyether-amine D 400, and polyetheramine D 2000; PC Amine® DA 250, PC Amine® DA 400, PC Amine® DA 650, and PC Amine® DA 2000;

In a further preferred embodiment of the invention, the alkylamines are alkylamines which exhibit imine groups and which are available, for example, under the name of Lupasol® (from BASF). Particularly suitable alkylamines that exhibit imine groups are Lupasol® FC, Lupasol® G 10, Lupasol® G 20, Lupasol® G 35, Lupasol® G 100, and Lupasol® G 500.

It is especially preferred if the additive exhibits a molecular weight of 200-4000, preferably of 300-2500. The additive is thereby typically less volatile or is not volatile at all and also leads to fewer malodorous nuisances.

According to the invention, the gypsum composition contains at least one comb polymer, which exhibits pendant chains bound by ester, amide, and/or ether groups to a backbone chain. "Exhibits" here means that in addition to at least one ester, amide, or ether group, further different pendant chains thereof may be included. Comb polymers often exhibit a combination of different pendant chains, which differ, for example, with respect to functional groups, lengths, or moiety in the total pendant chains. Such comb polymers are known in prior art.

Suitable comb polymers are, on the one hand, those which exhibit pendant chains bound by ether groups to the linear polymer structure. Pendant chains bound by ether groups to the linear polymer structure can be obtained by polymerization of vinylethers or allylethers. Such comb polymers, for example, are described in WO 2006/133933 A2, the substance of which is herewith included by reference.

In particular, the vinylethers or allylethers exhibit the formula (II):

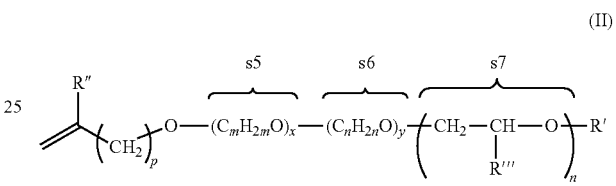

Here, R' stands for H or for an aliphatic hydrocarbon group with 1 to 20 C atoms or a cycloaliphatic hydrocarbon group with 5 to 8 C atoms or, if need be, a substituted aryl group with 6 to 14 C atoms. R" stands for H or for a methyl group, and R'" stands for an unsubstituted or substituted aryl group, in particular for a phenyl group. In addition, p stands for 0 or 1; m and n, independently of one another, each stand for 2, 3, or 4; and x and y and z, independently of one another, each stand for values in the range of 0 to 350. The sequence of the partial structural elements designated in formula (II) as s5, s6, and s7 can here be arranged as alternating, block-like, or random.

In formula (II), one vinyl group is represented as a terminal group on one side of the polymer. In one embodiment, however, the vinyl group is not included, because it has reacted during the polymerization reaction in a chain-breaking reaction to form a saturated group. Alternatively, the terminal vinyl group can be removed or modified in a reaction following polymerization.

In preferred embodiments, the comb polymer is a copolymer of vinylether or allylether with at least one comonomer, which is chosen from the group consisting of maleic acid anhydride, maleic acid, methacrylic acid, acrylic acid, methacrylamide, and acrylamide.

It has been shown that surprisingly good liquefying action is achieved in argillaceous gypsum compositions when the comb polymer is a copolymer of vinylethers with a comonomer that is chosen from the group consisting of maleic acid anhydride, maleic acid, acrylic acid, and acrylamide.

It has been further shown that surprisingly good liquefying action is achieved in argillaceous gypsum compositions when the vinylethers or allylethers, especially vinylether, exhibit a molecular weight of 500-10,000 g/mol, in particular 1000-5000 g/mol.

It is further preferred for the liquefying action in argillaceous gypsum com-positions if the comb polymer is a copolymer of vinylether with at least one comonomer and the mole ratio of vinylether to comonomer is 1-10 to 1, preferably 3-8 to 1.

Suitable as a comb polymer and preferred as the comb polymers previously described are, on the other hand, comb polymers with pendant chains bound by ester or amide groups to the linear polymer structure. In a preferred embodiment of the invention, the comb polymer is a copolymer with the formula (I)

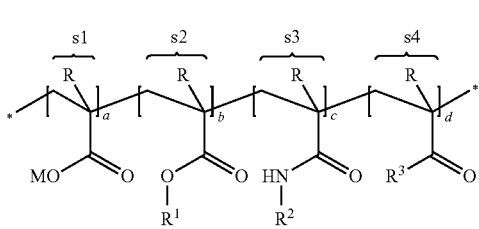

Here the M's stand, independently of one another, for H, an alkali metal ion, alkaline-earth metal ion, bi- or trivalent metal ion, ammonium ion, or organic ammon-ium group. The term "independent of one another" in the present document means, respectively, that a substituent can mean different things in the same molecule. Thus, for example, the copolymer with formula (I) can exhibit at the same time carbonic acid groups and sodium carboxylate groups, that is, which means that for the M's in this case, $H^+$ and $Na^+$ are independent of one another.

It is evident to the person skilled in the art that, on the one hand, a carboxylate is involved, to which the M ion is bound, and that, on the other hand, with polyvalent M ions, the charge due to opposing ions has to be balanced.

In addition, the substituents R stand, independently on one another, for hydrogen or for a methyl group.

Furthermore, the substituents $R^1$ stand, independently on one another, for $-[AO]_q-R^4$. The substituents $R^2$ stand, independently of one another, for an alkyl group, cycloalkyl group, or alkylaryl group with 1-20 C atoms, or for $-[AO]_q-R^4$. The substituent A stands in both cases, independently of one another, for a $C_2$ to $C_4$ alkylene group and $R^4$ for a $C_1$ to $C_{20}$ alkyl group, cyclohexyl group, or alkylaryl group, while q represents a value from 2 to 250, especially from 8 to 200, and especially preferred from 11 to 150.

Furthermore, the substituents $R^3$ stand, independently of one another, for $-NH_2$, $-NR^5R^6$, $-OR^7NR^8R^9$. Here, $R^5$ and $R^6$ stand, independently of one another, for a $C_1$ to $C_{20}$ alkyl group, cycloalkyl group or alkylaryl group or aryl group, or for a hydroxyalkyl group or for an acetoxyethyl-($CH_3-CO-O-CH_2-CH_2-$) or a hydroxyiso-propyl-($HO-CH(CH_3)-CH_2-$) or an acetoxyisopropyl group ($CH_3-CO-O-CH(CH_3)-CH_2-$); or $R^5$ and $R^6$ together form a ring, of which nitrogen is a part, in order to build a morpholine or imidazoline ring.

In addition, the substituents $R^8$ and $R^9$, independently of one another, each stand for a $C_1$ to $C_{20}$ alkyl group, cycloalkyl group, alkylaryl group, or aryl group, or for a hydroxyalkyl group.

The sequence of the structural partial elements designated in formula (II) as s1, s2, s3, and s4 can here be arranged as alternating, block-like, or random.

Finally, the subscripts a, b, c, and d represent molar ratios of the structural units s1, s2, s3, and s4. These structural elements have ratios of
a/b/c/d=(0.1-0.9)/(0.1-0.9)/(0-0.8)/(0-0.3),
in particular, a/b/c/d=(0.1-0.9)/(0.1-0.9)/(0-0.5)/(0-0.1),
preferred, a/b/c/d=(0.1-0.9)/(0.1-0.9)/(0-0.3)/(0-0.06), to one another such that a+b+c+d=1. The sum c+d is preferred to be greater than 0.

It has been shown that surprisingly good liquefying action is achieved in argillaceous gypsum compositions when R in formula (I) stands for hydrogen. Furthermore, a molecular weight for the structural units s2, s3, and s4 from 500-10,000 g/mol, especially 1000-5000 g/mol, affects the liquefying action in argillaceous gypsum compositions positively.

It has been further found, surprisingly, that the ratio of a/(b+c+d)=1-10, particularly 3-8, advantageously affects the liquefying action in argillaceous gypsum compositions.

In preferred embodiments of the invention, the comb-like polymers exhibit a molecular weight between 5000 and 500,000, in particular between 10,000 and 200,000 or between 20,000 and 150,000.

In formula (I), the two ends of the polymer are marked with an asterisk. The comb polymers can be modified at the ends of the backbone chain by different groups, depending on how the chain-breaking reaction occurs, which raw materials are used, and whether the polymer is subjected to a subsequent reaction, during which a remaining terminal vinyl group reacts. In particular embodiments, the terminal groups are to be chosen, independently of one another, from H, methyl, or vinyl.

Methods for manufacturing the comb polymers with formula (I) are known. The synthesis can, on the one hand, occur by free radical polymerization of the corresponding monomers or, on the other hand, by a so-called polymer-analogous reaction of a polycarbonic acid. In the polymer-analogous reaction, the polycarbonic acid with formula (IV) is esterified or amidated with the corresponding alcohols and/or amines, and then, if necessary, neutralized or partially neutralized (depending on the type of the group M, for example with metal hydroxides or ammonia). The polymer-analogous reaction is described, for example, in EP 1 138 697 B1 on page 7, line 20 to page 8, line 50 and in its examples or in EP 1 061 089 B1 on page 4, line 54 to page 5, line 38 and in its examples.

Suitable comb polymers are, for instance, those which are sold by the firm of Sika under the trademark of "Viscocrete".

An object of the invention is also an argillaceous gypsum composition containing
(a) at least one comb polymer as previously executed,
(b) at least one additive previously executed, and
(c) argillaceous gypsum.

The gypsum composition according to the invention contains, preferably:
(a) 0.1 to 5 wt. %, in particular 0.5 to 3 wt. %, of comb polymer,
(b) 0.01 to 2 wt. %, in particular 0.05 to 0.5 wt. %, of additive, and
(c) 15 bis 99.5 wt. %, especially 50 to 99 wt. %, of argillaceous gypsum.

According to the invention, a mixture is designated by the term "gypsum compositions which is suited to further processing into a shaped body. What is more, the gypsum composition can still be largely dry or already be mixed with water. The gypsum composition can be entirely or partially set. The gypsum is present in the mixture in the form of particles or in finely divided form.

According to the invention, the "gypsum" can be present in any known modification of gypsum or mixtures thereof. The gypsum is, in particular, chosen form calcium sulfate dihydrate, calcium sulfate-alpha-hemihydrate, calcium sulfate-β-hemihydrate, or calcium sulfate anhydride and mixtures thereof.

In a preferred embodiment, the gypsum is calcium sulfate-β-hemihydrate. Gypsum compositions based on calcium sulfate-β-hemihydrate are preferably used for the manufacture of drywall. Preferably, the gypsum composition includes at least 70 wt. % of calcium sulfate-β-hemihydrate; even more preferred is at least 90 wt. % of calcium sulfate-β-hemihydrate, relative to the total weight of the binder.

The gypsum composition according to the invention is argillaceous. In general, gypsum is industrially obtained in two different types. For one, gypsum can be obtained as more or less pure calcium sulfate as a byproduct in chemical processes, for instance in the desulfurization of flue gas. For another, gypsum is obtained from natural occurrences. Natural gypsum does not consist, however, of pure calcium sulfate but contains impurities of other minerals, due to which the composition varies, depending on the source. Natural gypsum often contains a more or less high proportion of clay. This contains clay minerals, which in general are phyllosilicates and can contain other organic or inorganic materials. In an embodiment of the invention, argillaceous gypsum is used that contains at least 0.2 wt. %, at least 0.5 wt. %, or at least 1 wt. % of clay. For instance, 0.1-20 or 0.5-10 wt. % of clay can be included.

The gypsum composition according to the invention contains at least 15 wt. %, preferably at least 50 wt. %, even more preferably at least 70 wt. % or at least 95 wt. %, of argillaceous gypsum, relative to the total weight. The argillaceous gypsum composition according to the invention can be water-free or can contain less than 0.5, 1, or 5 wt. % of water. It can, however, also contain up to 10, 20, 50, or 80 wt. % water. The proportion of additive (b) in an argillaceous gypsum composition according to the invention is, in a preferred embodiment, between 0.02 and 2 wt. %, in particular between 0.01 and 1 wt. %. In further preferred embodiments, the content of additive is between 0.05 and 0.5 wt. % or between 0.1 and 0.4 wt. %. In a preferred use, the gypsum composition is cement-free. Compositions are understood to be gypsum compositions, in particular, which contain exclusively or predominantly calcium sulfate as a binder, in particular more than 80 wt. % or more than 95 wt. % calcium sulfate.

In a preferred embodiment, the comb polymer/additive ratio is between 5:1 and 1:5, particularly between 2:1 and 1:2.

According to the invention, it is preferred, by using the comb polymers in association with the additives, to attain as low a proportion of water as possible, whereby the workability must be ensured.

The gypsum composition can contain, besides the argillaceous gypsum, a further binder. Other hydraulically setting substances besides gypsum fall under the term of "binder", such as, for instance, cement, in particular portland cements or alumina refractory cements and their respective mixtures with fly ash, silica fume, slag, casting sand, and lime, in particular limestone filler and calcined lime.

The gypsum composition can contain other admixtures, for instance fibers, other liquefiers, for example lignosulfonates, sulfonated naphthalene-formaldehyde condensates, sulfonated melamine-formaldehyde condensates, or polycarboxylate ether (PCE); accelerants, retardants, starches, sugars, silicones, shrinkage reducers, defoaming agents, foaming agents, dyes, agents for pH adjustment, fillers, fireproofing agents, or other common admixtures.

The gypsum compositions can also contain other polymers. For example, homo- or copolymers can be included which are made up of monomers chosen from the group consisting of ethylene, propylene, butylene, isoprene, butadiene, styrene, acrylonitrile, acrylic acid, methacrylic acid, acrylic acid alkylester, methacrylic acid alkylester, vinylester, and vinylchloride.

Especially preferred is a binder containing a mixture including the comb polymer, calcium sulfate-β-hemihydrate and at least one accelerant, as well as other admixtures such as are usual in the manufacture of drywall.

An object of the invention is also a dispersant for an argillaceous gypsum composition, containing
  (a) at least one comb polymer as previously executed, and
  (b) at least one additive that is chosen as executed above.
In a preferred embodiment of the invention, the dispersant contains
  (a) 1 to 95 wt. %, in particular 5 to 50 wt. %, of comb polymer,
  (b) 0.5 to 60 wt. %, in particular 5 to 40 wt. %, of additive, and
  (d) 0 to 98.5 wt. %, in particular 10 to 90 wt. %, of water.

According to the invention, a composition is generally designated as a "dispersant" that at the same time serves to improve the workability of a gypsum composition. The dispersant can, for example, be a solid or liquid admixture, in particular an aqueous solution or a dispersion.

The dispersant can contain further components. Examples are solvents or additives, such as are common in construction-materials chemistry, in particular surfactants, stabilizers against heat and light, dyes, defoaming agents, accelerants, retardants, and foaming agents. Insofar as the dispersant is a liquid admixture, it contains 20 to 98 wt. % or 50 to 95 wt. % of water.

In a preferred embodiment, the dispersant is a polymer dispersion. Such a polymer dispersion can contain, besides the comb polymer and water, other admixtures, for example viscosity regulators, dispersants, pyrogenic or colloidal silicon dioxide, phosphoric acids, biocides, fungicides, calcium sulfate, or amorphous aluminum oxide.

An object of the invention is also the use of a dispersant according to the invention to improve the workability of argillaceous gypsum compositions.

An object of the invention is also a method for the manufacture of an argillaceous gypsum composition according to the invention, including the steps of:
  (i) preparing the components (a), (b), and (c) as performed above and
  (ii) mixing the components, with further additions, if applicable, for the argillaceous bearing gypsum composition.

According to the invention, the comb polymer (a) and/or the additive (b) are added, separately or premixed, in solid or liquid form.

The comb polymer and/or the additive can be a component of the gypsum composition in the solid aggregate state, a so-called dry mixture. Such a composition can be stable in storage for a longer time and is typically packed up in bags or stored in silos. Such a dry mixture can be used even after a longer storage time and exhibits good fluidity. The additive according to the invention can likewise be a component of such a dry mixture.

The additive and/or comb polymer can also be added to a gypsum composition either during or shortly before or shortly after the addition of water. The addition of the additive and/or the comb polymer in the form of an aqueous solution or dispersion has been shown here to be especially suitable, in particular as mixing water or as part of the mixing water. The manufacture of the aqueous solution or dispersion of a comb polymer occurs, for example, by adding water during the manufacture of the comb polymer or during subsequent mixing of a comb polymer with water. Typically, the proportion of comb polymer then amounts to 10 to 90% by weight, particularly 20 to 50 wt. %, relative to the weight of the aqueous solution or dispersion.

In a preferred embodiment of the invention, a dry mixture of the gypsum composition is made first, which contains the argillaceous gypsum (c) and the comb-shaped polymer (a). The additive (b) is only added at a later point in time, for instance mixed with water. According to the invention, it can be an advantage to only add the additive shortly before processing. In this way, the amines can be kept from undergoing undesirable side reactions during long storage and the amines can be kept from producing undesirable malodorous effect over a longer time period.

In a preferred embodiment of the invention, the clay content of the gypsum is first determined prior to the manufacture of the gypsum composition according to the invention. The quantification can, for instance, take place by means of X-ray diffraction (XRD), in which the Rietveld method can be used. It can then be determined, for instance by comparison with a standard, how much additive has to be added.

An object of the invention is also a method for the manufacture of a gypsum shaped body, including the steps of
(iii) preparing an argillaceous gypsum composition according to the invention, which additionally exhibits water,
(iv) shaping for a shaped body, and
(v) hardening of the shaped body.

According to the invention, "shaped body" means any hardened object that exhibits a three-dimensional scope. The hardening of the shaped body takes place by drying in an oven or in the air.

The shaped body according to the invention can be a portable object, for instance drywall or a sculpture. The shaped body can however also be a filling or coating, for instance gypsum plaster, a floor covering or flooring plaster, or any product that results upon the distribution and hardening of a spackling compound, for example the filling for a cavity or a joint.

An object of the invention is also a gypsum shaped-body, which can be obtained according to a method according to the invention, especially in the form of drywall, flooring plaster, wall plaster, a sculpture, or a filling for a cavity.

Surprisingly, the addition of the additive according to the invention to an argillaceous gypsum composition in association with comb polymers solves the problem according to the invention. Even with the addition of the additive in very small amounts, 0.01 to 0.2 wt. % for example, it can be achieved that the comb polymer develops a liquefying action that is comparable to that with pure gypsum. Hence, due to the additive according to the invention in argillaceous gypsum compositions, having to increase the proportion of comb polymer as a liquefier can be prevented, in contrast to the case with non-argillaceous gypsum compositions. This is achieved, for example, with an additive amount that corresponds to between 10 and 150% (weight/weight) of the amount of the comb polymer used. Because lower-molecular-weight amines and ammonium compounds are simply available and are cost-effective, a simple and hence cost-effective method is made available for the liquefaction of argillaceous gypsum compositions.

EXAMPLES

The invention will now be clarified in detail using examples.
Comb Polymers (KPs) and Additives Used

TABLE 1

| | |
|---|---|
| KP-1, a comb polymer with the formula (I), whose R stands for hydrogen | |
| KP-2, a comb polymer with the formula (I), whose R stands for methyl | |
| Dipropylamine | Sigma-Aldrich Chemie GmbH, Switzerland |
| Lupasol ® G10 | BASF, Germany |
| Diaminobutane | Sigma-Aldrich Chemie GmbH, Switzerland |
| Tetrabutyl ammonium bromide | Sigma-Aldrich Chemie GmbH, Switzerland |
| Jeffamine ® M-600 | Huntsman, USA |
| Jeffamine ® M-2005 | Huntsman, USA |
| Jeffamine ® M-2070 | Huntsman, USA |
| Jeffamine ® ED-2003 | Huntsman, USA |
| Jeffamine ® D-230 | Huntsman, USA |
| Jeffamine ® M-2070 | Huntsman, USA |

The polymers KP-1 and KP-2 presented in Table 1 were made by means of a polymer-analogous reaction, from polyacrylic acid in the case of KP-1 and from polymethacrylic acid, respectively, in the case of KP-2, with the corresponding alcohols and amines, according to known types and methods. Details for the polymer-analogous reaction are disclosed, for example, in EP 1 138 697 B1 on page 7, line 20 to page 8, line 50 and in its examples, or in EP 1 061 089 B1 on page 4, line 54 to page 5, line 38 and in its examples.

Manufacture of Gypsum Slurries and Characterization of Flow Behavior

Slump (ABM), the beginning of stiffening (VB), and the end of stiffening (VE) of a gypsum slurry were determined as follows. First, 140 g of water were mixed with the comb polymer (liquefier) and the additive. The amount for this is set beforehand for the comb polymer or liquefier with respect to the amount of calcium sulfate. In comparison trials, the corresponding admixtures and/or comb polymer were dispensed with. Then 200 g of calcium sulfate-β-hemihydrate and 0.2 g of calcium sulfate dihydrate were sprinkled within 15 seconds into the water and the gypsum slurry was allowed to drain for 15 seconds. This was then stirred intensively for 30 seconds by hand. A minicone with a diameter of 50 mm and a height of 51 mm was filled and after 75 seconds, slump (ABM) was determined in millimeters.

The diameter of the gypsum cake thus formed was measured, until flows were no longer observed. The diameter in mm was designated as the slump. The beginning of stiffening and the end of stiffening were determined by the knife-cut method according to DIN EN 13279-2 and the thumb-pressure method. The beginning of stiffening (VB) is reached when, after a knife cut through the gypsum cake, the cut edges no longer run together. The end of stiffening (VE) occurs when, with a finger pressure of about 5 kg, water no longer comes out of the gypsum cake.

In order to set the clay content precisely and reproducibly, pure calcium sulfate is mixed with a set amount of clay. A calcium sulfate-β-hemihydrate was used together with calcium sulfate dihydrate as gypsum, and bentonite (Sigma-Aldrich Chemie GmbH, Switzerland) was added.

Comparison Examples

In order to determine the influence of the clay content on the action of a liquefier, a series of trials was conducted. No additive according to the invention was included in this experiment. Gypsum slurries were made with an increasing pro-portion of clay (bentonite, 0 to 2 wt. %, relative to the total amount of calcium sulfate) and a constant content of comb KP-1 polymer (0.2 wt. %, relative to the total amount of calcium sulfate), and the flow was measured. The results are presented in FIG. 1. The action of the liquefier clearly decreases with increasing clay content.

Figure 2:
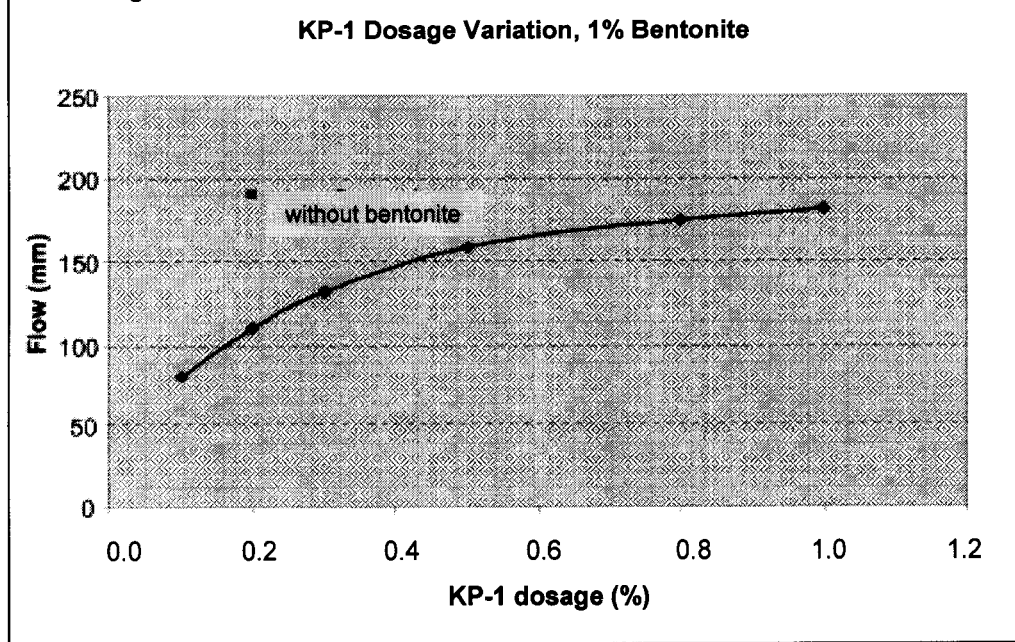

The proportion of comb KP-1 polymer was increased in a series of measurements with clay content remaining the same (bentonite, 1 wt. %). No additive according to the invention was included in this experiment. The results are presented in FIG. 2. In order to obtain a liquefying action to the extent comparable with non-argillaceous gypsum, a clearly increased amount of comb polymer has to be added (about five times as much).

Examples 1-5

Gypsum slurries were manufactured according to the invention with an in-creasing proportion in dipropylamine as an additive, and the properties were measured. The results are summarized in Table 2. Examples 1 and 2 are comparative examples.

TABLE 2

| Ex. | A Gypsum, % | B Clay, % | C KP-1, % | D Additive | E % | Flow [mm] | VB [min] | VE [min] |
|---|---|---|---|---|---|---|---|---|
| 1 | 100 | 0 | 0.2 | — | — | 209 | 5:00 | 12:30 |
| 2 | 99 | 1 | 0.2 | — | — | 103 | 2:00 | 7:00 |
| 3 | 99 | 1 | 0.2 | Dipropylamine | 0.05 | 178 | 3:30 | 8:57 |
| 4 | 99 | 1 | 0.2 | Dipropylamine | 0.10 | 212 | 4:00 | 10:25 |
| 5 | 99 | 1 | 0.2 | Dipropylamine | 0.20 | 225 | 6:40 | 13:00 |

A: Gypsum moiety, calcium sulfate (wt. %)
B: Clay moiety, bentonite (wt. %)
C: Comb polymer moiety, KP-1 (relative to amount of gypsum, in wt. %)
D: Additive, dipropylamine
E: Additive moiety (relative to amount of gypsum, in wt. %)

The results show that even small amounts of additive of 0.05 wt. % cause a significant improvement in flow and that the flow can be improved further with higher concentrations of the additive. The flow is, with the addition of 0.2 wt. % of additive, even above the flow of a comparable gypsum without a clay fraction.

Examples 6-13

Gypsum slurries were made as described above. The components and the quantitative fractions are given in Table 3. The results from Table 3 are presented in Table 4. Examples 6 and 7 are comparative examples.

TABLE 3

| Ex. | A Gypsum, % | B Clay, % | C KP | D % | E Additive | F % |
|---|---|---|---|---|---|---|
| 6 | 99 | 1 | KP-1 | 0.2 | — | — |
| 7 | 99 | 1 | KP-2 | 0.2 | — | — |
| 8 | 99 | 1 | KP-1 | 0.2 | Lupasol G10 | 0.07 |
| 9 | 99 | 1 | KP-2 | 0.2 | Lupasol G10 | 0.07 |
| 10 | 99 | 1 | KP-1 | 0.2 | Diaminobutane | 0.05 |
| 11 | 99 | 1 | KP-2 | 0.2 | Diaminobutane | 0.05 |
| 12 | 99 | 1 | KP-1 | 0.2 | Tetrabutyl ammonium bromide | 0.20 |
| 13 | 99 | 1 | KP-2 | 0.2 | Tetrabutyl ammonium bromide | 0.20 |

A: Gypsum moiety, calcium sulfate (wt. %)
B: Clay moiety, bentonite (wt. %)
C: Comb polymer
D: Comb polymer moiety, KP (relative to amount of gypsum, in wt. %)
E: Additive
F: Additive moiety (relative to amount of gypsum, in wt. %)

TABLE 4

| Ex. | Flow [mm] | VB [min] | VE [min] |
|---|---|---|---|
| 6 | 140 | 3:15 | 9:21 |
| 7 | 140 | 2:45 | 8:10 |
| 8 | 204 | 4:45 | 12:25 |
| 9 | 193 | 4.18 | 9:50 |
| 10 | 208 | 8:10 | 17:40 |
| 11 | 189 | 5:40 | 12:20 |
| 12 | 209 | 5:10 | 12:20 |
| 13 | 193 | 4:10 | 11:30 |

The results show that, with the additives of the invention, flow and workability can clearly be improved. Furthermore, two different comb polymers were used in examples 6 to 13. KP-1 is a comb polymer with formula (I) whose R in formula (I) stands for hydrogen. KP-2 is a comb polymer with formula (I) whose R in formula (I) stands for methyl The results show that with the additives of the invention in the case of KP-1, in contrast to KP-2, a greater improvement in flow and processing time is attained.

Examples 14-25

Gypsum slurries were made with different types and pro-portions of polyether amines as the additive, and the properties were measured. The components and quantitative proportions are given in Table 5. The results from Table 5 are presented in Table 6. Examples 14 and 15 are comparative examples.

TABLE 5

| Ex. | A Gypsum, % | B Clay, % | C KP | D % | E Additive | F % |
|---|---|---|---|---|---|---|
| 14 | 100 | — | KP-1 | 0.2 | — | — |
| 15 | 99 | 1 | KP-1 | 0.2 | — | — |
| 16 | 99 | 1 | KP-1 | 0.2 | Jeffamine ® M-600 | 0.20 |
| 17 | 99 | 1 | KP-1 | 0.2 | Jeffamine ® M-600 | 0.10 |
| 18 | 99 | 1 | KP-1 | 0.2 | Jeffamine ® M-2005 | 0.20 |
| 19 | 99 | 1 | KP-1 | 0.2 | Jeffamine ® M-2005 | 0.10 |
| 20 | 99 | 1 | KP-1 | 0.2 | Jeffamine ® M-2070 | 0.20 |
| 21 | 99 | 1 | KP-1 | 0.2 | Jeffamine ® M-2070 | 0.45 |
| 22 | 99 | 1 | KP-1 | 0.2 | Jeffamine ® ED-2003 | 0.40 |
| 23 | 99 | 1 | KP-1 | 0.2 | Jeffamine ® ED-2003 | 0.20 |

TABLE 5-continued

| Ex. | A Gypsum, % | B Clay, % | C KP | D % | E Additive | F % |
|---|---|---|---|---|---|---|
| 24 | 99 | 1 | KP-1 | 0.2 | Jeffamine ® D-230 | 0.10 |
| 25 | 99 | 1 | KP-1 | 0.2 | Jeffamine ® D-230 | 0.05 |

A: Gypsum moiety, calcium sulfate (wt. %)
B: Clay moiety, bentonite (wt. %)
C: Comb polymer
D: Comb polymer moiety, KP-1 (relative to amount of gypsum, in wt. %)
E: Additive
F: Additive moiety (relative to amount of gypsum, in wt. %)

TABLE 6

| Example | Flow [mm] | VB [min] | VE [min] |
|---|---|---|---|
| 14 | 200 | 4:50 | 12:20 |
| 15 | 122 | 2:50 | 9:15 |
| 16 | 204 | 4:41 | 11.25 |
| 17 | 187 | 4.20 | 11:20 |
| 18 | 208 | 4:25 | 11:40 |
| 19 | 186 | 3:51 | 10:30 |
| 20 | 170 | 4:43 | 11:25 |
| 21 | 212 | 4:52 | 11:25 |
| 22 | 199 | 5:10 | 14:25 |
| 23 | 159 | 3:45 | 10:30 |
| 24 | 222 | 7:00 | 14:50 |
| 25 | 200 | 5:00 | 13:37 |

The results show that even small amounts of polyetheramines as an additive of 0.05 wt. % cause a significant improvement in flow and that the flow can be improved further with higher concentrations of the additive. The flow corresponds, with the addition of 0.05 wt. % of additive in example 25, even to the flow of a comparable gypsum without a clay portion (example 14).

The invention claimed is:

1. A method of improving workability of an argillaceous gypsum composition, comprising:
adding an additive selected from primary and secondary alkyl amines, which optionally exhibit respectively at least one hydroxy group and/or ether group, to the argillaceous gypsum composition that comprises argillaceous gypsum and at least one comb polymer that exhibits pendant chains bound by ester, amide, and/or ether groups to a backbone chain,
wherein a weight ratio of comb polymer to the additive is between 5:1 and 1:2 and the alkyl amines are polyether amines.

2. The method according to claim 1, wherein the alkyl amines are monoamines, diamines, or triamines.

3. The method according to claim 1, wherein the alkyl amines are chosen from:
R1-NH$_2$, R2-NH—R2', and NH$_2$-R3R3-NH$_2$,
wherein R1, R2, and R2' are alkyl groups independent of one another with 1 to 200 C atoms, and
R3 is an alkyl group with 1 to 150 C atoms.

4. The method according to claim 3, wherein
R1, R2, and R2' are alkyl groups independent of one another with 30 to 150 C atoms, and
R3 is an alkyl group with 20 to 120 C atoms.

5. The method according to claim 1, wherein the comb polymer is a copolymer of vinylether or allylether with at least one comonomer which is selected from the group consisting of maleic acid anhydride, maleic acid, methacrylic acid, acrylic acid, methacrylamide, and acrylamide.

6. The method according to claim 5, wherein the comb polymer is a copolymer of vinylether with at least one comonomer and the molar ratio of vinylether to comonomer is 1-10 to 1.

7. The method according to claim 1, wherein the comb polymer is a copolymer of formula (I):

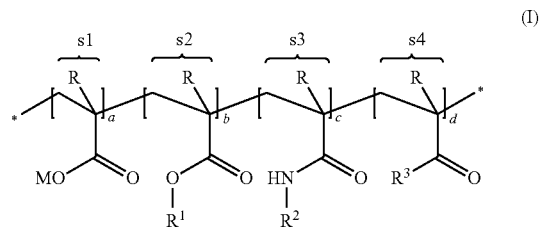

in which
M stands, independently of one another, for H, an alkalimetal ion, alkaline-earth metal ion, bi- or trivalent metal ion, ammonium ion, or organic ammonium group;
R, each independent of the other groups R in formula (I), stands for hydrogen or for a methyl group;
$R^1$ stands for -[AO]$_q$-$R^4$, independently of one other;
$R^2$ stands, independently of one another, for an alkyl group, cycloalkyl group, or alkylaryl group with 1-20 C atoms, or for -[AO]$_q$-$R^4$,
wherein A stands for a $C_2$ to $C_4$ alkylene group and $R^4$ for a $C_1$ to $C_{20}$ alkyl group, cyclohexyl group, or alkylaryl group;
and q = 2-250;
$R^3$ stands, independently of one other, for —NH$_2$, —NR$^5$R$^6$, or —OR$^7$NR$^8$R$^9$,
wherein $R^5$ and $R^6$ stand, independently of one another, for a $C_1$ to $C_{20}$ alkyl group, cycloalkyl group or alkylaryl group, or aryl group; or
for a hydroxyalkyl group,
or for an acetoxyethyl or hydroxyisopropyl or acetoxyisopropyl group,
or $R^5$ and $R^6$ together form a ring of which nitrogen is a part, to build a morpholine or imidazoline ring;
wherein $R^7$ stands for a $C_2$-$C_4$ alkylene group;
and $R^8$ and $R^9$, each independently of one another, stand for a $C_1$ to $C_{20}$ alkyl group, cycloalkyl group, alkylaryl group, aryl group, or for a hydroxyalkyl group;
and wherein a, b, c, and d represent mole ratios of the structural units s1, s2, S3, and s4
and a/b/c/d =(0.1-0.9)/(0.1-0.9)/(0-0.8)/(0-0.3) such that a +b+c+d=1.

8. The method according to claim 7, wherein R in formula (1) stands for hydrogen.

9. The method according to claim 7, wherein in formula (I) the ratio is
a/(b+c+d)=1-10.

10. The method according to claim 1, wherein the polyether amines are polyether monoamines or polyether diamines.

11. The method according to claim 5, wherein the comb polymer is a copolymer of vinylether with a comonomer which is selected from the group consisting of maleic acid anhydride, maleic acid, acrylic acid, and acrylamide.

12. The method according to claim 9, wherein in formula (I) the ratio is a/(b+c+d)=3-8.

13. The method according to claim 1, wherein the weight ratio of comb polymer to the additive is between 2:1 and 1:2.

* * * * *